Dec. 6, 1932.    J. R. HEIDLOFF    1,889,987
MASTER CYLINDER PISTON FOR HYDRAULIC BRAKE SYSTEMS
Filed Aug. 18, 1930
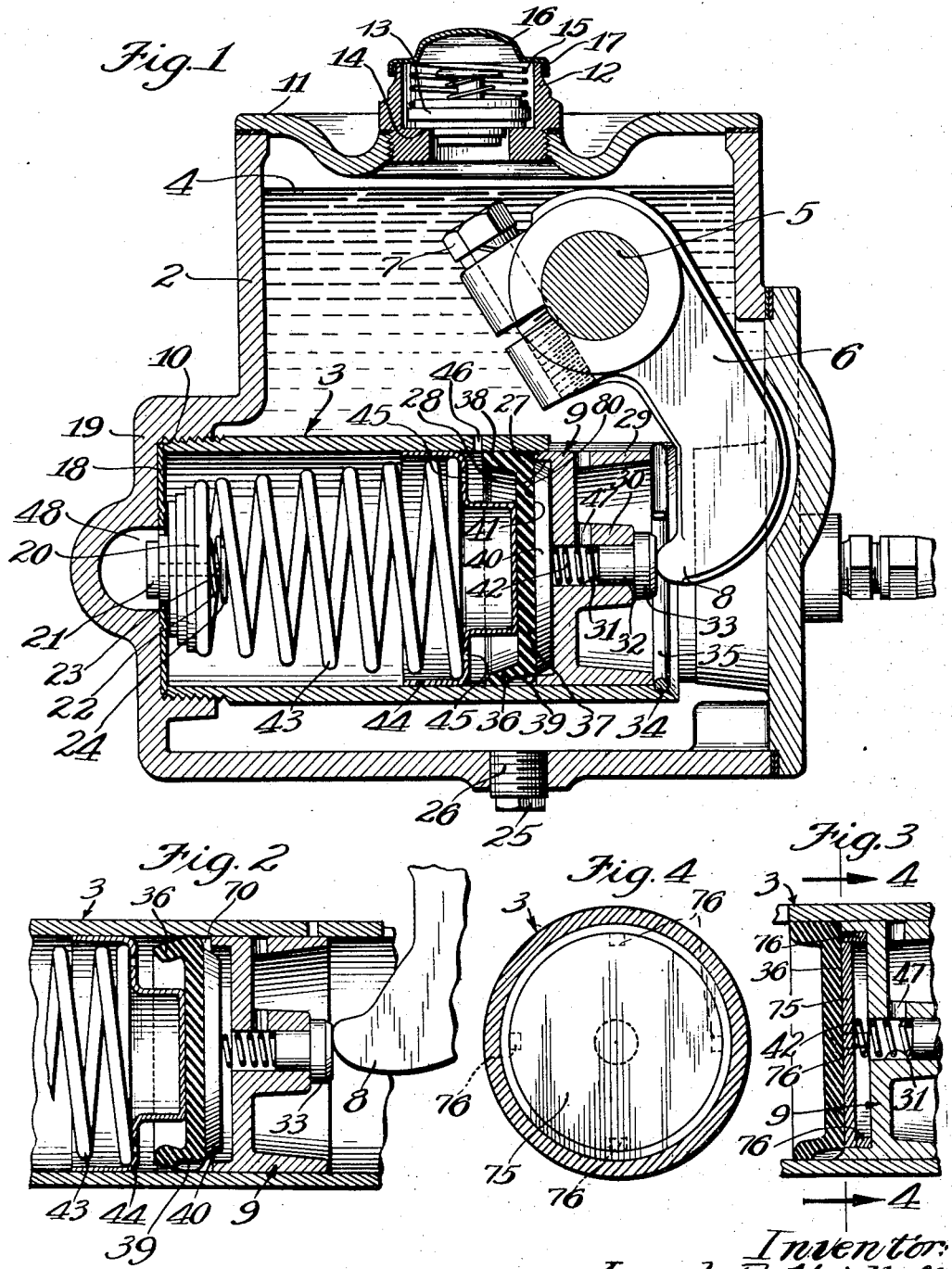
Inventor:
Joseph R. Heidloff
By Williams, Bradbury, McCalb
& Hinkle.
Attys.

Patented Dec. 6, 1932

1,889,987

UNITED STATES PATENT OFFICE

JOSEPH R. HEIDLOFF, OF DETROIT, MICHIGAN, ASSIGNOR TO HYDRAULIC BRAKE COMPANY, OF DETROIT, MICHIGAN, A CORPORATION OF CALIFORNIA

MASTER CYLINDER PISTON FOR HYDRAULIC BRAKE SYSTEMS

Application filed August 18, 1930. Serial No. 475,972.

The invention relates to hydraulic brake systems and more particularly to an improvement in the master cylinder associated therewith.

In a hydraulic braking system such as illustrated in an application of Malcolm Loughead, Serial No. 304,195, filed September 6, 1928, and issued on March 1, 1932, as Patent No. 1,847,402, the master cylinder piston is arranged with a series of holes to provide a passage for fluid from the rear of the piston and around the base of a packing cup associated with the piston upon the retractile movement of the same. The packing cup is firmly seated against the piston during the pressure stroke of the same and there is a likelihood, particularly under high braking pressures, of the cup material being forced into these holes which would hinder the proper passage of fluid through these holes and in extreme instances would cause the ruination of the packing cup. To obviate this condition I have devised a novel means of protecting the packing cup, and an object of my invention is the provision of an improved master cylinder piston.

A further object is to provide a master cylinder having a master piston provided with a packing cup having means interposed between the cup and the piston which prevent direct contactual engagement between the cup and the piston.

A further object is to provide a master piston in combination with a packing cup and a protective disc interposed between the cup and piston which is most positive in its operation to interrupt communication between the master cylinder and the fluid reservoir during the pressure stroke of the piston and to admit fluid into the cylinder during the return stroke of the piston.

The above objects, as well as others not particularly pointed out, will appear from the following description with reference to the accompanying drawing in which like reference characters in the several views denote like parts and in which Fig. 1 is a longitudinal section taken through the reservoir and the master cylinder which contains the improved master piston of my invention;

Fig. 2 is a fragmentary sectional view of the forward end of the master cylinder showing the position of the master piston and its associated parts during the retractile movement of the same;

Fig. 3 is a fragmentary sectional view of the master cylinder illustrating a modified form of master piston; and Fig. 4 is a sectional view along the line 4—4 of Fig. 3 looking in the direction of the arrows indicated thereon.

Referring to the drawing and particularly to Figs. 1 and 2, the housing 2 containing the master cylinder 3 with which the master cylinder piston of my invention is associated is suitably attached to the frame of an automobile and constitutes a reservoir which under normal conditions stands full of liquid to about the level as indicated at 4.

An operating shaft 5 is journaled in the opposite walls of the housing 2 and carries an external lever which is linked to the foot brake pedal of the automobile (not shown). A lever 6 is rigidly secured to the shaft 5 by a bolt 7 within the housing 5 and has a hook-shaped end 8 serving to transfer the rotary motion of the shaft 5 to the piston indicated generally by the reference character 9 and operating within the master cylinder 3. The master cylinder 3 has threaded engagement at 10 with one end of the housing 2 and is thereby rigidly held in place in a horizontal position. The reservoir or housing 2 is provided with a cover 11 which supports a filling cap 12 and comprises a double acting valve 13 which is yieldingly held on the shoulder 14 by means of a coil spring 15 which engages a plate 16 fixed on the upper edge 17 of the filling cap wall.

A valve seat 18, held in position between the end of the master cylinder 3 and the side 19 of the reservoir 2, cooperates with a double acting valve 20 having a passageway therethrough which is normally closed by a second valve 21. The valve 21 is held in place by a spring 22 which exerts a pressure longitudinally on a pin 23 through the medium of its head 24. As the double acting valve 20 forms no part of my invention a detailed description of its operation will not be given, suffice to say that it is actuated by movement of the piston 9 in the master cylinder 3 to regulate the pressure within the lines and the wheel cylinders of the brakes and to control the flow of brake fluid from and to the master cylinder 3 upon the compression and suction strokes of the piston 9 mounted therein. A suitable drain plug 25 is provided in a tapped opening 26 in the bottom of the reservoir for permitting the same to be drained from time to time as required.

The master piston 9 of my invention comprises a face portion 27 provided with a counterbore 28 and a rearwardly extending flange 29 and a centrally located rearwardly extending lug 30 provided with a central bore 31 into which is fitted a wear piece or stud 32 having a head 33 on its outer end adapted to be engaged by the hooked end 8 of the actuating lever 6. The free or piston end of the master cylinder 3 is provided with a groove 34 in which is fitted a C-shaped spring retaining member 35 adapted to be engaged by the annular edge of the flange 29 of the master piston 9 when in its normal position.

A rubber packing cup 36 is associated with the master piston 9 and comprises a flat disc-shaped portion 37 surrounded by a peripheral flange 38 extending axially from the disc-shaped portion 37 and is provided with a plurality of spaced grooves 39 extending in an axial direction toward the piston 9. A disc washer 40 provided with a beveled or tapered edge rests against the face 41 of the disc-shaped portion 37 of the cup 36 under the influence of a helical spring 42 resting in the bore 31 in the piston 9.

The cup 36 and washer 40 are urged into the position illustrated in Fig. 1 with the washer 40 extending into the counterbore 28 in the face 27 of the piston 9 by a retractile spring 43 which has one end resting against a cup-like spring retainer 44 bearing against the cup 36 and receives and holds in position this end of spring 43. The opposite end of the spring 43 bears against the valve 20 to normally retain the valve 20 in contact with its seat 18. The retainer 44 is provided with a plurality of openings 45 for the passage of brake fluid past the retainer.

The light compression spring 42 resting within the central bore 31 of the piston 9 has its one end engaging the face of the washer 40 and its other end engaging the plug 32 in the piston and acts to force the piston 9 away from the cup 36 and washer 40 upon the return stroke of the piston, as will be more clearly hereinafter described. The master cylinder 3 is provided with an opening 46 which communicates with the interior of the cylinder immediately forward of the inner end of the packing cup 36 which permits fluid from the reservoir to pass directly into or out of the master cylinder when the piston 9 is in its normal position, as illustrated in Fig. 1. The piston 9 is provided with a duct 47 through the central lug 30 to the rear side of the piston 9 and communicates with the central bore 31 so that upon the return movement of the master piston 9 under the influence of the retractile spring 43 fluid will pass through the duct 47 and bore 31 and by the peripheral flange 38 of the packing cup 36 as will presently be described.

In the operation of the apparatus thus described the movement of the master piston 9 into the master cylinder 3 under the influence of the lever 6 causes a fluid pressure in the master cylinder 3 to unseat the valve 21 and permit fluid under pressure to pass through the outlet 48 into the brake system. The pressure in the master cylinder 3 forces the peripheral flange 38 of the packing cup 36 firmly into engagement with the cylindrical wall of the master cylinder 3 so that no fluid can escape past the packing cup 36 during the protractile movement of the piston 9. Upon this forward movement of the piston 9 the tapered washer 40 is maintained within the counterbore 28 and as the thickness of the washer 40 is the same as the depth of the counterbore 28 and as the diameter of the bottom face 80 of the washer 40 is substantially that of the counterbore 28, this bottom face 80 of the washer 40 and the annular portion of the face 27 of the piston 9 forms a substantially flat continuous face against which the face 41 of the packing cup 36 is forced under the influence of the fluid pressure in the cylinder 3 which prevents cutting of the cup 36 by the inner peripheral edge of the counterbore 28.

Upon the return movement of the piston 9 under the influence of the spring 43, the fluid pressure within the cylinder 3 will decrease on account of the check valve 20 which retards the return flow of fluid from the system into the cylinder. The reduced pressure in the cylinder 3 is also aided by a partial vacuum created in the cylinder as the spring 43 forces the piston 9 to its retracted position, and the spring 42 in the bore 31 of the piston 9 now acts to force the piston 9 away from the washer 40 and cup 36. The fluid pressure in the reservoir 2, which is the same at all times, now becomes greater than the fluid pressure in the cylinder 3 during the retractile movement of the piston, allowing the fluid from the reservoir 2 to flow through the duct 47 and bore 31 and the passage 70 around the base of the washer 40 and cup 36, which passage 70 permits the free passage of fluid, as clearly illustrated in Fig. 2, past the packing cup 36. The grooves 39 in the packing cup 36 facilitate the passage of liquid past the packing cup 36 and as the flange 38 of the same is flexible it is flexed inwardly to unseat the flange from engagement with the walls of the cylinder 3.

In this manner, at the end of the retractile movement of the piston 9 there is a greater quantity of fluid in the cylinder 3 and in the system than is necessary for the operation of same, and continued flow of fluid from the system as the wheel cylinder pistons move to their retractile position, will cause all excess fluid in the cylinder 3 to pass up through the small passage 46 in the cylinder wall to the reservoir 2. When the piston 9 is in its fully retracted position and the fluid pressure in the cylinder 3 and reservoir 2 are equal, the spring 43 again forces the washer 40 into the counterbore 28 in the head of the piston 9 to again compress the spring 42 in the bore 31.

It is most essential that the area of the duct opening 47 be greater than the area of the passage 70 around the base of the cup 36 and washer 40 caused by the movement of the piston 9 under the influence of the spring 42, as before pointed out, to overcome the tendency of the piston 9 to adhere to the washer 40 due to the partial vacuum created on the pressure side of the piston as the same is retracted under the influence of the retractile spring 43. With the area of the duct 47 sufficiently large the fluid pressure from the reservoir 2 through the duct 47, in combination with the effort of the spring 42, will overcome this adhesive tendency to permit the proper function of the packing cup 36 at all times.

The bleeder passage which includes the bore 31 is located centrally in the piston 9 and is covered by the washer 40 during the protractile or pressure stroke of the piston 9 so that under braking pressure no portion of the packing cup 36 covers this bleeder passage, which eliminates the possibility of the forcing of the cup material into the bore 31.

In the modification illustrated in Figs. 3 and 4 fragmentary sections of the master cylinder, piston 9 and the packing cup 36 are shown. The member interposed between the cup 36 and piston 9 is in the form of a disc 75 having four integrally formed lugs 76 depending therefrom. The length of the lugs 76 is the same as the depth of the counterbore 28 in the face 27 of the piston 9.

The disc 75 rests against the face 41 of the disc-shaped portion 37 of the cup 36 under the influence of a helical spring 42 resting in bore 31 of the piston 9 and maintains the disc 75 in contactual engagement with the cup 36 at all times. Upon the protractile movement of the piston 9 a pressure is produced in the cylinder 3 and upon the retractile movement of the piston 9 the spring 42 acts to force the piston 9 away from the disc 75 and cup 36, as previously described, and fluid from the reservoir passes through the duct 47 and bore 31 around the base of the disc 75 and cup 36, permitting the free passage of fluid past the packing cup 36.

The operation and function of the disc 75 in combination with the packing cup 36 is the same as previously described in connection with Figs. 1 and 2, but in the modification shown the depending lugs 76 do not permit contactual engagement between the disc 75 and the bottom of the counterbore 28 to eliminate the adhesive tendency upon the retractile movement of the piston 9.

While I have illustrated and described my invention for a particular use, it is to be understood that the piston of my invention is applicable for other uses, and changes and modifications may be made, but I am to cover all such changes as come within the spirit and scope of the appended claims.

What I claim as new and desire to cover by United States Letters Patent is:

1. In mechanism of the class described, the combination of a cylinder, a piston reciprocable therein, a packing cup adjacent the forward face of said piston, a fluid supply in communication with the rear of said piston, said piston having a passageway therethrough, and a movable member for preventing said packing cup from being forced into said passageway during the protractile stroke of said piston.

2. In a hydraulic brake mechanism of the class described, the combination of a cylinder, a piston reciprocable therein, a fluid supply to the rear of said piston, a packing cup associated with the forward face of said piston around the region of said passageway through said piston, and a member engaging said cup and movable therewith for preventing said packing cup from engaging said piston around the region of said passageway during the protractile stroke of said piston.

3. In a hydraulic brake mechanism of the class described, the combination of a cylinder, a piston reciprocable therein, a packing cup associated with the forward face of said piston, a fluid supply to the rear of said cylinder, means engaged by said cup and cooperating with said piston to provide a continuous flat contacting face for said cup during the protractile movement of said piston, and spring means for moving said means and said cup relative to said piston upon the retractile movement of the piston to permit fluid to flow past said cup.

4. In a hydraulic brake mechanism of the class described, the combination of a cylinder, a piston reciprocable therein, a packing cup associated with said piston, a fluid supply to the rear of said piston, a passageway extending through said piston, a member engaging said cup, and a counter-bore in said piston for receiving said member to provide a flat contacting surface for said cup during the protractile movement of said piston, said member preventing said cup from being forced into said passageway during said movement.

5. In a hydraulic brake mechanism of the class described, the combination of a cylinder, a piston reciprocable therein, a packing cup associated with said piston, a fluid supply to the rear of said piston, a passageway extending through said piston, a member engaging said cup, a counter-bore in said piston for receiving said member to provide a flat contacting surface for said cup during the protractile movement of said piston, said member preventing said cup from contacting said piston in the environs of said passageway, and spring means for moving said piston relative to said member and cup during the retractile stroke thereof to permit fluid to flow past said cup.

6. In a hydraulic brake mechanism of the class described, the combination of a cylinder, a piston reciprocable therein, a fluid on both sides of said piston, a fluid passage in said piston, a packing cup adjacent the forward face of said piston, means interposed between said cup and piston to provide a smooth contacting surface for said cup during the protractile stroke of said piston, and spring means for separating said cup and said means from said piston during the retractile stroke of said piston to provide an annular passage between said piston and said cup and said means to allow fluid delivered through said fluid passage to pass forwardly past said cup.

7. In a hydraulic brake mechanism of the class described, the combination of a cylinder, a piston reciprocable therein, a fluid on both sides of said piston, a fluid passage in said piston, a packing cup adjacent the forward face of said piston, a disc interposed between said cup and piston, a counter-bore in the forward face of said piston for entry of said disc to provide a smooth contacting surface for said cup during the protractile stroke of said piston, and spring means for moving said piston relative to said cup and disc during the retractile stroke of said piston to provide an annular passage between said piston and said cup and disc to allow fluid delivered through said fluid passage to pass forwardly past said cup.

8. In hydraulic brake mechanism of the class described, the combination of a cylinder, a piston reciprocable therein and affording a fluid passageway therepast, a source of fluid supply in communication with the rear of said piston during the retractile stroke thereof, a packing member associated with the forward face of said piston to form a fluid-tight seal during the protractile stroke thereof, and means cooperating with said piston to provide a support for said packing member during the protractile stroke of said piston and movable relative to said piston during the retractile stroke thereof to permit fluid to flow past said piston.

9. In a master cylinder for hydraulic brakes, the combination of a cylinder, a piston reciprocable therein, said piston having a recessed face communicating with a passageway past said piston, means for advancing said piston, a spring for returning said piston, a rubber cup packing adjacent the forward face of said piston, and a movable member of relatively hard material covering said recess and affording a smooth surface for said cup packing during the forward stroke of the piston, said member being actuated by said cup packing during the forward stroke of the piston to close said recess, and permitting fluid to flow past said piston during the return stroke thereof.

10. In mechanism of the class described, the combination of a cylinder, a piston reciprocable therein, said piston having a passage therethrough terminating at one end in a recess formed in the face of the piston, a member adapted to fit in said recess, said member when so pisitioned having a forward face lying in the plane of the forward face of the piston, means for reciprocating said piston, a packing cup adjacent the forward face of said piston, and means including cooperating surfaces on said piston and member for centering said member relative to the recess in said piston.

11. In mechanism of the class described, the combination of a cylinder, a piston reciprocable therein, said piston having a passageway therethrough, a packing cup adjacent the forward face of said piston, the rear face of said piston being in communication with a body of fluid, and a member closing said passageway and providing a seat for said packing cup during the forward stroke of said piston, said member movable relative to said piston and having centering means extending into said passageway.

12. In mechanism of the class described the combination of a cylinder, a piston reciprocable therein, said piston having a recess in its forward face and being provided with a fluid passageway between said recess and the rear of said piston, there being a body of fluid in communication with the rear of said piston, a self-centering member for closing said recess during the forward stroke of said piston and movable therefrom during the return stroke to permit flow of fluid past said piston, and a relatively soft packing member adjacent the forward face of said piston for moving said self-centering member to close said recess during the forward stroke of said piston.

In witness whereof, I hereunto subscribe my name this 14 day of Aug., 1930.

JOSEPH R. HEIDLOFF.

CERTIFICATE OF CORRECTION.

Patent No. 1,889,987.  December 6, 1932.

JOSEPH R. HEIDLOFF.

It is hereby certified that error appears in the printed specification of the above numbered patent requiring correction as follows: Page 3, line 102, claim 2, strike out the words "around the region of said" and insert instead "and movable therewith, a"; and that the said Letters Patent should be read with this correction therein that the same may conform to the record of the case in the Patent Office.

Signed and sealed this 14th day of February, A. D. 1933.

(Seal)

M. J. Moore,
Acting Commissioner of Patents.